2,901,509

HEXACHLOROBICYCLO-DIAMINOPHENYL ETHERS

Hyman M. Molotsky and Sidney B. Richter, Chicago, Ill., assignors to Velsicol Chemical Corporation, Chicago, Ill., a corporation of Illinois No Drawing. Application August 16, 1956
Serial No. 604,330

6 Claims. (Cl. 260—571)

This invention relates to the production of new compositions of matter. More specifically, the present invention relates to the production of new halogenated diamines which are useful in the production of fire resistant cured epoxy resins. The composition of the present invention has the structure:

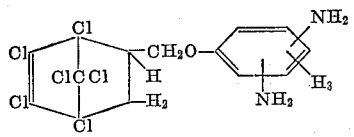

and is termed a (5-methylene-1,2,3,4,7,7-hexachlorobicyclo(2.2.1)-2-heptenyl)-diaminophenyl ether.

The compound of the present invention is useful as a curing agent for epoxy resins containing epoxide groups. In particular, resins which are formed by aqueous alkaline condensation of epichlorohydrin and bis-phenol are advantageously cured by the product of the present invention.

While diamines have heretofore been used as condensation or curing agents with epoxy resins, they have in general been hydrocarbon diamines such as phenylenediamine, and the epoxy resins which were cured therewith are flammable and do not have adequate heat resistance.

The composition of the present invention is useful to produce cured epoxy resins which are fire and heat resistant and have superior physical properties as regards strength, crush resistance, impact resistance, dielectric strength, and the like.

Epoxy resins cured with the diamine of the present invention are useful as potting resins, casting resins, dip coatings, saturants for fiberglass, electrical insulators and the like where fire and heat resistant properties are especially desirable.

The cure of epoxy resins as above described takes place with other well-known diamines by reaction of the amine hydrogens with the epoxide groups. The rate of such reaction with most diamines is relatively slow. As a distinguishing feature the diamine of the present invention provides a rapid rate of cure. This property is especially valuable in that the present composition makes fire resistant cured epoxy resins possible with rapid cure schedules which are necessary to maintain efficient and economic production in industry.

The compositions of the present invention are solids and as such are particularly well suited for use as curing agents for epoxy resins, since liquid or more volatile diamines could not readily be used at elevated temperatures without added hazard of toxic fumes.

The halogenated diamines of the present invention may be prpepared by reduction of the corresponding dinitroether by any of the means known to the art for the reduction of dinitro compounds. The dinitroether intermediate may be prepared by adducting hexachlorocyclopentadiene with allyl alcohol and reacting the resulting adduct in the presence of an inorganic base with a chlorodinitrobenzene. Alternatively, the dinitroether intermediate can be prepared by reacting the adduct of hexachlorocyclopentadiene and allyl chloride with a metallic salt of a dinitrophenol in the presence of an inorganic base. Both procedures produce the same halogenated dinitrophenylether.

The adductions are carried out using the hexachlorocyclopentadiene reactant as a solvent and the adduction temperature may vary from about 70° C. to about 220° C. The ratio of reactants should be at least equimolar but an excess of hexachlorocyclopentadiene can be used as solvent, or, if desired, other inert solvents may also be utilized. However, the use of additional solvents is neither necessary nor preferred. The time of adduction will vary with the temeprature but is generally from about 30 minutes to about 48 hours.

The etherification reaction is carried out in the presence of a molar equivalent of an inorganic base such as potassium hydroxide. The identical ether can be produced by either reacting the allyl chloride-hexachlorocyclopentadiene adduct with a metallic salt of a dinitro phenol, such as 2,4-dinitro sodium phenolate, or by reacting the allyl alcohol-hexachlorocyclopentadiene adduct with a chlorodinitro benzene, such as 1-chloro 2,4-dinitrobenzene, provided the nitro substituents are in the same position on the ring. 1-chloro-2,4-dinitrobenzene is a commercially available product resulting from the nitration of chlorobenzene. During the reaction of the adduct with either the chlorodinitro benzene or the dinitro phenolate, it is preferred to have an excess of the dinitro substituted reactant. One of the better methods known to the art for the reduction of dinitro compositions to the diamine is by the use of iron and hydrochloric acid. This method may be used to produce the diamines of the present invention, but it is only one possible method for reducing the intermediate dinitro ether.

The halogenated diamines of the present invention can also be prepared by first forming an allyl, dinitrophenyl ether, adducting the ether with hexachlorocyclopentadiene in a Diels-Alder manner and reducing the adduct to the desired diamine. The allyl, dinitrophenyl ether intermediate may be prepared by the reaction of a chlorodinitrobenzene and allyl alcohol in the presence of an inorganic base such as potassium hydroxide or by the reaction of a metallic salt of a dinitrophenol, such as sodium dinitro phenolate, with allyl chloride. Identical ethers are produced by both processes.

The following examples will illustrate the preparation of the diamino compounds by various methods and the preparation of cured epoxy resins therefrom:

EXAMPLE I

*Adduction of hexachlorocyclopentadiene with allyl alcohol*

In a glass reactor is placed hexachlorocyclopentadiene (137 g.; 0.5 mol) which is heated to 150° C. To the hot reactant is slowly added (ca. 20 minutes) allyl alcohol (29 g.; 0.5 mol) which has been warmed to 60° C. Heating is continued at 150° C. for an additional 4 hours and the contents of the flask permitted to cool.

EXAMPLE II

*Preparation of dinitro phenyl ether*

In a glass reaction vessel is placed 1-chloro-2,4-dinitrobenzene (100 g.; 0.5 mol), the adduct of Example I, and a solution of potassium hydroxide (28 g.; 0.5 mol) in 100 ml. of water. The reactants are heated at reflux for 4 hours with stirring, and cooled. The cooled solution is then filtered to remove precipiated KCl. The filtrate is further concentrated by heating under atmospheric pressure and vacuum and the concentrate extracted with diethyl ether. The ether solution is washed with water and dried over anhydrous calcium chloride. After filtration of the ether solution, the ether is removed by vacuum evaporation and the residual oily product is dissolved in ethanol. The product is precipitated by addition of water and recovered as an oily layer from the aqueous ethanolic supernate.

EXAMPLE III

Reduction of dinitro phenyl ether

A mixture of 36 grams (0.07 mol) of the product of Example II, 400 ml. of benzene and 25 ml. of water is heated to reflux with vigorous stirring and to the refluxing reactants are added 130 grams of iron powder (reduced by hydrogen) over a period of one hour. Concentrated hydrochloric acid (25 ml.) is then added over a period of one hour and the reaction mixture is maintained at reflux for a period of 2 additional hours. The residual iron powder sludge is removed by filtration and washed with benzene. The filtrate and benzene washings are combined, washed with water, and dried with anhydrous sodium sulfate. The benzene solution is concentrated by heating and the crude product recovered from the chilled concentrate by filtration. The crude product is then recrystallized from heptane and identified as (5-methylene-1,2,3,4,7,7-hexachlorobicyclo (2.2.1)-2-heptenyl)-2,4-diaminophenyl ether.

EXAMPLE IV

Adduction of hexachlorocyclopentadiene with vinyl chloride

In a glass reactor is placed hexachlorocyclopentadiene (137 g.; 0.5 mol) which is heated to 150° C. To the hot reactant is slowly added (ca. 20 minutes) allyl chloride (38.3 g.; 0.5 mol) which has been warmed to 60° C. Heating is continued at 150° C. for an additional 4 hours and the contents of the flask permitted to cool.

EXAMPLE V

Preparation of diamine phenyl ether

In a glass reaction vessel is placed 2,4 dinitro sodium phenolate (103 g.; 0.5 mol), the adduct of Example IV and a solution of potassium hydroxide (28 g.; 0.5 mol) in 100 ml. of water. The reactants are heated at reflux for 4 hours with stirring and cooled. The cooled solution is then filtered to remove precipitated KCl. The filtrate is further concentrated by heating under atmospheric pressure and vacuum and the concentrate extracted with diethyl ether. The ether solution is washed with water and dried over anhydrous calcium chloride. After filtration of the ether solution, the ether is removed by vacuum evaporation and the residual oily product is dissolved in ethanol. The product is precipitated by addition of water and recovered as an oily layer from the aqueous ethanolic supernate. This product is then reduced to the desired diamino ether product by the method described in Example III.

EXAMPLE VI

Preparation of allyl, 2,4-dinitrophenyl ether

In a glass reaction vessel was placed 1-chloro-2,4-dinitrobenzene (100 g.; 0.5 mol), allyl alcohol (400 ml.), and a solution of potassium hydroxide (28 g.; 0.5 mol) in 100 ml. of water. The reactants were heated at reflux for 4 hours with stirring, and cooled. The cooled solution was then filtered to remove precipitated KCl. The filtrate was further concentrated by heating under atmospheric pressure and vacuum and the concentrate extracted with diethyl ether. The ether solution was washed with water and dried over anhydrous calcium chloride. After filtration of the ether solution, the ether was removed by vacuum evaporation and the residual oily product was dissolved in ethanol. The product was precipitated by addition of water and recovered as an oily layer from the aqueous ethanolic supernate.

EXAMPLE VII

Adduction of hexachlorocyclopentadiene with allyl dinitrophenyl ether

Into a glass reactor was placed hexachlorocyclopentadiene (137 g.; 0.5 mol) which was heated to 150° C. To the hot reactant was slowly added (ca. 20 minutes) 2,4-dinitrophenyl allyl ether prepared in Example VI which was warmed to 60° C. Heating was continued at 150° C. for an additional 4½ hours, and the contents of the flask permitted to cool. The crude product was crystallized twice from heptane and a crystalline product melting at 139–142° C. was recovered.

EXAMPLE VIII

Reduction of hexachlorocyclopentadiene-dinitrophenyl allyl ether adduct

A mixture of 36 grams (0.07 mol) hexachlorocyclopentadiene-dinitrophenyl allyl ether adduct, 400 ml. of benzene and 25 ml. of water was heated to reflux with vigorous stirring and to the refluxing reactants was added 130 grams of iron powder (reduced by hydrogen) over a period of one hour. Concentrated hydrochloric acid (25 ml.) was then added over a period of one hour and the reaction mixture was maintained at reflux for a period of 2 additional hours. The residual iron powder sludge was removed by filtration and washed with benzene. The filtrate and benzene washings were combined, washed with water, and dried with anhydrous sodium sulfate. The benzene solution was concentrated by heating and the crude product recovered from the chilled concentrate by filtration. The crude product was then recrystallized from heptane and 25.5 grams of material was recovered which melted at 132.5–133.5° C., which was the desired diamino product.

| Analysis | O | H | Cl | $N_2$ |
|---|---|---|---|---|
| Calculated for $C_{14}H_{12}Cl_6ON_2$ | 38.47 | 2.77 | 48.67 | 6.41 |
| Found for product | 38.86 | 2.95 | 48.39 | 6.25 |

EXAMPLE IX

Into a glass reaction vessel equipped with a reflux condenser and stirrer is placed 2,3-dinitrophenol (18.4 g.; 0.1 mol), potassium carbonate (14 g.; 0.1 mol), allyl chloride (8 g.; 0.1 mol), and 30 grams of acetone. The contents of the vessel are heated at reflux with stirring for 8 hours and permitted to cool. To the cooled reactants are added water and aqueous sodium hydroxide with stirring. The crude allyl 2,3-dinitrophenyl ether is extracted with ether and washed with water. The ether solvent and residual allyl chloride are removed by vacuum distillation. The ether product is then heated with about 27 grams (0.1 mol) of hexachlorocyclopentadiene at about 150° C. for 5 hours. The adduct of hexachlorocyclopentadiene and allyl 2,3-dinitrophenyl ether thus produced is recovered by filtration and purified by crystallization from heptane. The adduct is reduced according to the procedure in Example III and purified in the same manner to produce the desired 2,3-diamino derivative.

EXAMPLE X

Into a glass reaction vessel equipped with a reflux condenser and stirrer is placed 3,5-dinitrophenol (18.4 g.; 0.1 mol), potassium carbonate (14 g.; 0.1 mol), allyl chloride (8 g.; 0.1 mol), and 30 grams of acetone. The contents of the vessel are heated at reflux as described in Example IX, and similarly treated with sodium hydroxide and water. The crude allyl 3,5-dinitrophenyl ether is extracted with diethyl ether, and the ether extract washed with water. The ether solvent and traces of allyl chloride are removed by vacuum distillation.

The ether product is then heated with about 27 grams (0.1 mol) of hexachlorocyclopentadiene at about 150° C. for 5 hours. The adduct of hexachlorocyclopentadiene and allyl 3,5-dinitrophenyl ether thus produced is recovered by filtration and purified by crystallization from heptane. This adduct is reduced with iron and hydrochloric acid according to the scheme of Example III to produce the desired (5-methylene -1,2,3,4,7,7-hexachlorobicyclo (2.2.1)-2-heptenyl)-3'5'-diaminophenyl ether.

Other species of the present invention are (5-methylene-1,2,3,4,7,7-hexachlorobicyclo (2.2.1)-2-heptenyl)-2'6'-diaminophenyl ether and (5-methylene-1,2,3,4,7,7-hexachlorobicyclo (2.2.1) - 2 - heptenyl) - 3'4' - diaminophenyl ether.

The diamines as prepared in the foregoing examples are useful in curing epoxy resins, and in particular are useful in curing epoxy resins which are derived from condensation of epichlorohydrin and bis-phenol. Other epoxides which are not resins in themselves can also be cured to resinous products, such as for example, bis-epoxy cyclopentyl ether or other epoxide compounds.

Generally, the product of the present invention is useful in curing liquid epoxy resins such as above described. Exemplary of such resins is a product sold under the trade name of Epon 828 which is a liquid having an epoxide equivalent of 1 mol for about 200 grams of resin. Other amines such as phenylene diamine have been used commercially for such applications.

The amount of diamine utilized is calculated from the number of mols of epoxide available either in the compound or in the epoxy resin. For example, with diamines in general ¼ mol is required to cure one mol of epoxide. The liquid epoxide resins have variable amounts of epoxide per unit weight of resin as above illustrated. Other mol ratios of diamine to epoxide can also be utilized, but it is preferred to keep the above described ratio which is approximately the stoichiometric amount.

The following examples will illustrate the procedure and method of curing an epoxy resin with the present novel diamine compound:

EXAMPLE XI

To 6.8 grams of an epoxy resin formed from condensation of epichlorohydrin and bis-phenol (sold under trade name Epon 828) was added 4.0 grams of the diamine as prepared in Example VIII. The reactants were mixed with heating at about 100° C. and poured into a test tube. The test tube was heated at 95-100° C. The resin was fairly hard after ½ hour and completely hardened at 2¾ hours. Further heating at 100° C. for ten hours had no apparent effect. The cured epoxy resin was resistant to deformation at 165° C. while a similar epoxy resin cured with phenylene diamine was elastically deformable at 150° C. The resin was fire-resistant and was self-extinguishing after removal from an oxidizing flame.

The mixing operation is standard procedure and since the diamine is solid, warming is necessary to obtain adequate mixing of the reactants. The rate of cure of the epoxy resins with the diamine of the present invention varies in an inverse manner with the temperature of cure. Thus at higher temperatures such as about 120° C. the cure is complete to hardness in about 20 minutes, while at about 80° C. the cure to hardness may take as long as 4 to 5 hours.

The fire resistant epoxy resins of the present invention are useful as potting resins for electrical elements such as coils. They are resistant to heat and are also resistant to burning, which is especially valuable in electrical application, but which also may be utilized in other industrial applications.

As previously discussed, the compositions of the present invention are solids which have a rather low vapor pressure. Liquid diamines and some solid diamines used for curing epoxy resins are rather volatile and present a toxic hazard in view of this volatility. The present compounds' low volatility and relatively insoluble character reduce this well known toxic hazard to a considerable degree and make industrial handling somewhat safer than is ordinarily possible.

We claim:

1. As a new composition of matter a compound of the structure

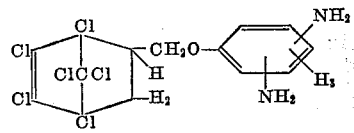

2. A compound of the structure

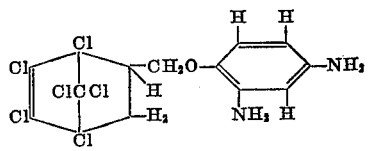

3. A compound of the structure

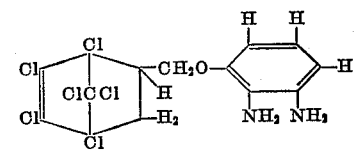

4. A compound of the structure

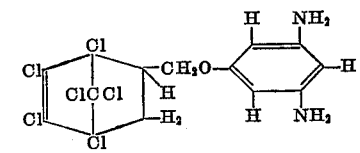

5. A compound of the structure

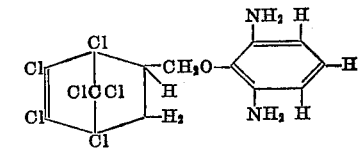

6. A compound of the structure

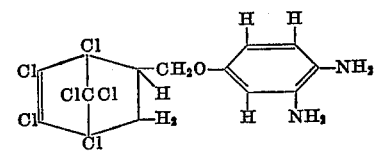

References Cited in the file of this patent

UNITED STATES PATENTS 2,721,882    Schmerling _____ Oct. 25, 1955